No. 821,837. PATENTED MAY 29, 1906.
W. STANLEY.
DYNAMO ELECTRIC APPARATUS.
APPLICATION FILED MAY 25, 1905.
Fig.1.
Fig.1a.
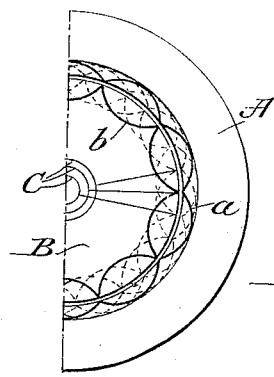
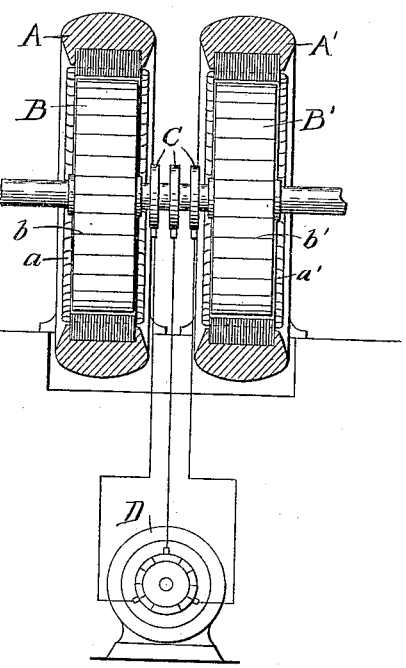
Fig.1b.
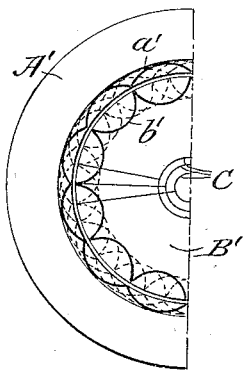
Fig.2.
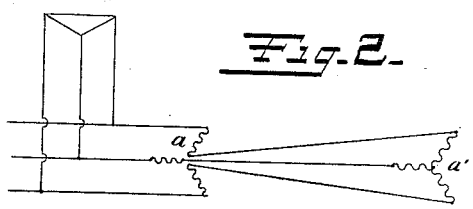
Fig.3.
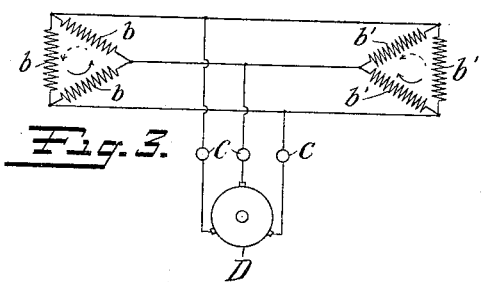
Witnesses
Chas. W. Gerrish
L. Vreeland.
Inventor
William Stanley
By his Attorneys
Bartlett, Brownell & Mitchell

UNITED STATES PATENT OFFICE.

WILLIAM STANLEY, OF GREAT BARRINGTON, MASSACHUSETTS.

DYNAMO-ELECTRIC APPARATUS.

No. 821,837. Specification of Letters Patent. Patented May 29, 1906.

Application filed May 25, 1905. Serial No. 262,225.

*To all whom it may concern:*

Be it known that I, WILLIAM STANLEY, a citizen of the United States, residing at Great Barrington, Berkshire county, Massachusetts, have invented certain new and useful Improvements in Dynamo-Electric Apparatus, of which the following is a full, clear, and exact description.

My invention relates to improvements in dynamo-electric apparatus, and has for its object to provide means for generating alternating currents of a desired potential gradient.

The purpose of my invention is to produce an alternator energized by alternating currents which will give a substantially constant potential for all loads. This is brought about in the particular embodiment hereinafter described by the use of two generating elements, which when energized by constant-potential currents have opposite normal potential gradients when supplying unity power factor currents. By "normal potential gradient" I mean the potential gradient which an element will have when energized by constant-potential currents. The potential gradients of these two elements can be combined so as to neutralize each other and produce a resultant potential gradient. The resultant potential gradient existing when the alternator is magnetized at constant potential I term the "normal resultant potential gradient." The two elements described each have a negative potential gradient when supplying lagging currents, producing when combined a negative normal resultant potential gradient, so that by the use of an exciter which has a complementary or positive potential gradient when the alternator is supplying lagging currents a constant potential can also be obtained from the alternator under these conditions.

The following is a description of an apparatus embodying my invention, reference being had to the accompanying drawings, in which—

Figure 1 is an elevation of an alternator, partly in section. Fig. 1ª is a partial left-hand side elevation of the apparatus of Fig. 1. Fig. 1ᵇ is a partial right-hand side elevation of said apparatus. Fig. 2 is a diagram of the stator-circuits. Fig. 3 is a diagram of the rotor-circuits.

Referring more particularly to the drawings, A A' are two stators. B B' are two rotors mounted on a common shaft and having their windings connected to slip-rings C. D is an exciter supplying low-frequency alternating currents having a potential gradient substantially complementary to the normal resultant potential gradient of the two generating elements when acting conjointly.

In the particular embodiment shown the stators A A' are the induced members and have similar windings $a$ $a'$ wound to have the same number of poles as their respective rotors. The rotors B B' are the field structures and differ from each other, in that one is wound so as to have a different number of poles from the other. Thus, for instance, the winding $b$ of the rotor B may be considered to form ten poles, while the winding $b'$ of the rotor B' forms twelve poles. The windings on both rotor structures are multiphase and are supplied with alternating currents from the exciter D, producing magnetic fields rotating relatively to the rotor or field structure at different polar speeds.

The windings $b$ and $b'$ are reversed relatively to each other, so that the fields produced by them rotate in opposite directions relatively to one another, as shown by the dotted arrows. (See Fig. 3.) Thus if the direction of rotation of the rotor is clockwise, as shown by the full arrows, (see Fig. 3,) the winding $b$, forming ten poles, will produce a field rotating magnetically clockwise or in the same direction relatively to the rotor, and the winding $b'$, forming twelve poles, will produce a field rotating counter-clockwise or in the opposite direction relatively to the rotor. Such clockwise and counter-clockwise electromagnetic rotation of the fields combines with the structural rotation of the rotor to respectively increase (clockwise) and decrease (counter-clockwise) the effective rotation of the flux produced by the rotor, and consequently to increase and decrease the frequency of the electromotive forces and currents induced upon the stator-circuits. Suppose that the exciter D supplies currents of five periods and the rotors are revolving at the rate of six hundred revolutions per minute. In that case with the construction above described the frequency of the currents from each stator would be fifty-five periods; for if the excitation were by continuous currents the periodicity of the current from the stator A would be $\frac{10 \times 600}{120} = 50$, while the periodicity of the current from the stator A' would be $\frac{12 \times 600}{120} = 60$. When, however, five-period alternating exciting-currents are employed, the rotating fields of B produced by the exciting-currents travel faster than the rotor by five periods, and therefore increase the periodicity of the currents furnished by A, while the fields of B' reduce by five periods the periodicity of the currents furnished by A', so that the periodicity of the current furnished by both A and A' will be the same, or fifty-five. Now the element A B is operating below synchronism, and therefore its normal potential gradient is negative, while the element A' B' is operating above synchronism, and therefore its normal potential gradient is positive. If, therefore, the windings a a' of the two stator elements are connected in section, as shown in Fig. 2, the two gradients will neutralize one another to a greater or less extent according to their several characteristics and by proper proportionment can be made to neutralize each other entirely.

In case lagging loads are supplied by the alternator the normal potential gradients of both elements will be negative, producing a negative normal resultant potential gradient, and under these conditions the exciter should have a positive potential gradient if the alternator is to supply constant-potential currents—that is, the potential gradient of the exciter should be complementary to the normal resultant potential gradient. By reason of the reaction of the alternator element under such conditions with proper proportioning the exciter can be made to have such a positive potential gradient and to automatically neutralize the tendency of the alternator potential to fall under such conditions.

Energy-currents in the work-circuit tend to cause superimposed currents to flow in the rotor-circuits, which are opposite or substantially one hundred and eighty degrees apart. If, therefore, the rotors are so connected in parallel to the exciter, as shown in Fig. 3, the exciter will be called upon to deliver to the machine magnetizing-currents only when the machine is delivering power factor unity load. When the machines are delivering lagging currents, however, the superimposed rotor-currents are not one hundred and eighty degrees apart in phase or opposite to each other, but coincide in phase. Such superimposed currents will therefore flow through the exciting-circuit. Under these conditions, then, the characteristic of the alternator when excited by constant potential would be that of substantially constant potential when delivering power factor unity load, the normal resultant potential gradient being zero, and of decreasing potential when delivering power factor zero load, the normal resultant potential gradient being negative.

In order to maintain constant potential for any load, the exciter should therefore be constructed to give an increasing potential when the alternator is furnishing lagging currents and substantially constant potential when they are furnishing power factor unity currents.

The windings shown in the diagrams are three-phase. The invention is obviously not limited to the use of such windings or to the particular relations or proportions mentioned, since it can also be carried out by other multiphase windings, so long as the inducing fields rotate magnetically in different directions and the periodicities of the induced electromotive forces are the same.

What I claim is—

1. In a system for generating electric currents, the combination of two generating elements having opposite normal potential gradients and common supply-mains leading therefrom.

2. In a system for generating alternating currents, the combination of two generating elements each consisting of a field-producing winding and an induced winding, an alternating-current exciter supplying currents to said field-producing windings such as to set up poles revolving magnetically in opposite directions, common mains connected to said induced windings, and means for producing mechanical motion between said field-producing and said induced windings, the windings being such that the periodicities of said induced windings are equal.

3. In an alternator, the combination of a pair of stators and a pair of rotors, multiphase windings upon one of said pairs, forming unequal numbers of poles, circuits for supplying alternating currents to said multiphase windings such as to produce fields rotating in opposite directions, induced windings upon the other of said pairs, and means for revolving the rotors at a rate such that the periodicities of the electromotive forces generated in the induced windings shall be equal.

4. In an alternator, the combination of two stators and two rotors, said rotors being each provided with multiphase windings, one of said windings producing a larger number of poles than the other, the poles produced by the two windings rotating magnetically in opposite directions, means for supplying alternating currents to said windings, and means for rotating said rotors so that the periodicities of the stators shall be the same.

WILLIAM STANLEY.

Witnesses:
JOSEPH C. FIEM,
F. L. SNOW.

Correction in Letters Patent No. 821,837.

It is hereby certified that in Letters Patent No. 821,837, granted May 29, 1906, upon the application of William Stanley, of Great Barrington, Massachusetts, for an improvement in "Dynamo-Electric Apparatus," an error appears in the printed specification requiring correction, as follows: Page 2, line 23, the word "section" should read *series;* and that the said Letters Patent should be read with this correction therein that the same may conform to the record of the case in the Patent Office.

Signed and sealed this 19th day of June, A. D., 1906.

[SEAL.]

F. I. ALLEN,
*Commissioner of Patents.*